United States Patent [19]
Baik

[11] Patent Number: 5,773,804
[45] Date of Patent: Jun. 30, 1998

[54] ELECTRONIC PASSBOOK SYSTEM USING ELECTRONIC PASSBOOK CARD AND METHOD OF USING THE SAME THEREIN

[75] Inventor: In-Seong Baik, Anyang, Rep. of Korea

[73] Assignee: Samsung Electronics Co., Ltd., Suwon, Rep. of Korea

[21] Appl. No.: 572,722

[22] Filed: Dec. 14, 1995

[30]    Foreign Application Priority Data

Jan. 20, 1995 [KR]   Rep. of Korea ...................... 948/1995

[51] Int. Cl.⁶ ...................................................... G06F 17/60
[52] U.S. Cl. ........................... 235/379; 235/375; 235/380; 902/25; 902/26
[58] Field of Search .................................... 235/379, 380, 235/382, 375; 902/5, 6, 25, 26

[56]               References Cited

U.S. PATENT DOCUMENTS

| | | | |
|---|---|---|---|
| 4,114,027 | 9/1978 | Slater et al. | 235/379 |
| 4,630,201 | 12/1986 | White | 364/408 |
| 4,736,094 | 4/1988 | Yoshida | 235/380 X |
| 4,742,351 | 5/1988 | Suzuki | 235/350 X |
| 4,804,825 | 2/1989 | Bitoh | 235/380 |
| 4,837,422 | 6/1989 | Dethloff et al. | 235/380 X |
| 4,864,108 | 9/1989 | Hamada et al. | 235/379 |
| 4,882,779 | 11/1989 | Ratgen | 380/24 |
| 5,017,766 | 5/1991 | Tomada et al. | 902/26 X |
| 5,060,153 | 10/1991 | Nakagawa | 364/405 |
| 5,144,115 | 9/1992 | Yoshida | 235/379 |
| 5,386,103 | 1/1995 | DuBan et al. | 235/379 |
| 5,386,104 | 1/1995 | Sime | 235/380 X |
| 5,438,184 | 8/1995 | Roberts et al. | 235/380 |
| 5,521,362 | 5/1996 | Powers | 235/380 |

FOREIGN PATENT DOCUMENTS

| | | |
|---|---|---|
| 57-196369 | 12/1982 | Japan . |
| 63-263848 | 10/1988 | Japan . |

*Primary Examiner*—Donald T. Hajec
*Assistant Examiner*—Michael G. Lee
*Attorney, Agent, or Firm*—Robert E. Bushnell, Esq.

[57]               ABSTRACT

An electronic passbook system including an electronic passbook card having two separate account namely a general account and an electronic wallet account, allowing the user to conduct cash deposit and cash withdrawal transactions flexibly, safely and efficiently in both an "on-line" mode and an "off-line" mode. The electronic passbook card has a data memory containing a general account information area for recording information for processing cash deposit and withdrawal transactions in an "on-line" mode, and an electronic wallet account information area for performing mutual transmission with the general account information area in an "on-line" mode and recording information for processing cash withdrawal transactions in an "off-line" mode. Thus, a user can conduct both cash deposit and withdraw transactions in an "off-line" as well as an "on-line" mode as desired

20 Claims, 4 Drawing Sheets

ELECTRONIC PASSBOOK SYSTEM USING ELECTRONIC PASSBOOK CARD AND METHOD OF USING THE SAME THEREIN

CROSS-REFERENCE TO RELATED APPLICATIONS

This application makes reference to, incorporates the same herein, and claims all benefits accruing under 35 U.S.C. §119 from an application for Electronic Passbook System Using An Electronic Passbook Card And Method Of Using The Same Therein earlier filed in the Korean Industrial Property Office on 20 Jan. 1995 and assigned Ser. No. 1995/948.

BACKGROUND OF THE INVENTION

1. Technical Field

The present invention relates to an electronic passbook card system including an electronic passbook card and a card terminal device using the passbook card and a method for enabling users to conduct financial transactions including, for example, cash withdrawal, fund transfer and payment and deposit transactions with the passbook cards at the card terminal device during both "on-line" and "off-line" operations.

2. Background Art

Conventional magnetic strip cards are plastic cards having a magnetic recording medium attached thereon for enabling users to conduct banking transactions with automated-teller machine (ATM) terminals in accordance with information encoded on the cards. Typically, magnetic strip cards are either read-only cards such as, for example, cash cards and credit cards, or read-and-write cards such as bank cards or prepaid coupon-type cards such as, for example, phone cards and subway tokens. Some bank cards such as those described, for example, in U.S. Pat. No. 3,845,277 for Off-Line Cash Dispenser And Banking System issued to Voss et al., and U.S. Pat. No. 4,114,027 for On-Line/Off-Line Automated Banking System issued to Slater et al., are capable of allowing users to conduct banking transactions including cash withdrawal, fund transfer, and payment and deposit transactions based upon an evaluation of data encoded on the user's cards "on-line" as well as off-line. These conventional magnetic strip cards however do not allow the users to inquire for the transaction contents of the cards. Moreover, they are simple in structure such that they can be easily be forged, and the fraudulent use of forged cards has become a great problem.

As a viable alternative to the magnetic strip cards, IC cards such as those disclosed, for example, in U.S. Pat. No. 4,630,201 for On-Line And Off-Line Transaction Security System Using A Code Generated From A Transaction Parameter And A Random Number issued to White, U.S. Pat. No. 4,742,351 for IC Card System issued to Suzuki, and U.S. Pat. No. 5,144,115 for Transaction Inquiring Method And Apparatus issued to Yoshida, have been recently available for ATM terminals. The IC card contains an integrated circuit installed in a plastic card and provided on one side with LCD display section and battery for enabling the user to inquire and provide a visual display of the transaction contents thereon. The IC card also contains a RAM, a ROM, a central processing unit, and a nonvolatile memory capable of storing financial information such as, for example, the name of the financial institution, the account number of the customer, his address, an account balance and a secret password. The IC card can be used with ATM terminals in two modes; that is, "on-line" mode and "off-line" mode. In the "on-line" mode, the IC card is inserted in a card terminal such as an ATM terminal connected to a host computer or a central processor of a financial institution. In the "off-line" mode, the IC card is inserted in a card terminal installed in a bank or a shop and not connected to such a host computer, during the "off-line" mode the terminal is not controlled by the host computer (e.g., perhaps due to an accident or due to the design of the system in which the host computer is not always maintained on-line).

When the IC card is used in the "off-line" mode, all data about every transaction made by using the card is stored in the memory contained in the IC card. The user of the card then takes the IC card to the financial institution, for example, once a week or month, and the transaction data is read out from the IC card and used to update and balance his or her account. Consequently, the collection of the "off-line" transaction is delayed and balance of the card holder's account is not updated and may be incorrect. In order to collect "off-line" transaction data quickly and update the card holder's account, U.S. Pat. No. 4,804,825 for IC Card System issued to Bitoh teaches an IC card system which allows the user to update all "off-line" transaction data stored in the memory whenever the user executes an "on-line" transaction. That is, every time an "on-line" transaction is executed by the user of IC card when the IC card is inserted into the ATM terminal, the card is checked by the ATM terminal to ascertain whether any "off-line" transaction data remains in the card, uncollected by the financial institution, or the like. If remaining uncollected, the "off-line" transaction data is immediately read from the IC card and transferred to the host computer installed in the financial institution "on-line," and is thereby collected. Hence, the balance of the card holder's account, the credit data, and the other data stored in the IC card can be updated relatively soon after the "off-line" transaction has been made. Bitoh '825 also provides security against potential fraudulent "off-line" use of the IC card by controlling the number of "off-line" transactions from the card's holder account.

Alternatively, U.S. Pat. No. 5,060,153 for Teller Machine With Mode For Continuously Sending Off-Line Collected Transaction Data To A Host While Ignoring Incomplete Data Response Signals issued to Nakagawa requires the ATM terminal to temporarily retain "off-line" transaction data in a buffer and transmit such "off-line" transaction data to the host computer in response to specific command from the host computer when the IC card system is "on-line." These conventional IC cards are however inflexible in that they carry financial information of only designated general account of the cards' holders, and both "on-line" and "off-line" transactions such as cash withdrawal and deposit can only be made with respect to the general account. Thus, the user does not have complete control of his or her general account with the financial institution. Moreover, these conventional IC cards do not have an efficient security mechanism to protect the card's holder from fraudulent "off-line" use of the IC card.

SUMMARY OF THE INVENTION

Accordingly, it is therefore an object of the present invention to provide an improved electronic passbook process and card.

It is another object to provide a novel electronic passbook card having a general account separate from an electronic wallet account for allowing the user to conduct cash deposit and cash withdrawal transactions flexibly, safely and efficiently in both an "on-line" mode and an "off-line" mode.

It is another object to provide an electronic passbook system using the electronic passbook card for allowing the user to conduct cash deposit and withdrawal transactions both in an "on-line" mode and an "off-line" mode.

It is still another object to provide a method of using the electronic passbook system for enabling the user to conduct "off-line" cash withdrawal transactions with the user's account using the electronic passbook card having a general account separate from an electronic wallet account.

It is a further object to provide a method of using the electronic passbook system for enabling the user to conduct "off-line" cash deposit transactions with the user's account using the electronic passbook card having a general account separate from an electronic wallet account.

To achieve these and other objects, the present invention contemplates an electronic passbook card having a data memory with a general account information area for storing information corresponding to the name of a financial institution, the account number, the balance and transaction records of a general account of a card's holder, and an electronic wallet account information area for storing information corresponding to the name of a financial institution, the account number, the balance and transaction records of a wallet account of the card's holder. A control device, upon insertion of the electronic passbook card into a card terminal by the card's holder, allows the card's holder to conduct financial transactions through the card terminal with both the general account and wallet account when the card terminal is "on-line" with the financial institution, to record cash withdrawal transactions in the wallet account when said card terminal is "off-line" with the financial institution after designated funds have been transferred from the general account into the wallet account "on-line" by the card's holder, and to record cash deposit transactions in the wallet account when said card terminal is "off-line" with the financial institution irrespective of any funds transferred from the general account into the wallet account of the card's holder. The electronic passbook card may also contain a display section for allowing the card's holder to display transaction contents of the general account and the wallet account when the card terminal is either "on-line" or "off-line" with the financial institution.

Another aspect of the present invention contemplates upon an electronic passbook system using an electronic passbook card containing information corresponding to the name of a financial institution, the account number, the balance and transaction records of a general account of a card's holder for allowing the card's holder to conduct banking transactions during an "on-line" mode, and an electronic wallet account of the card's holder for allowing the card's holder to conduct the banking transactions during an "off-line" mode. A card terminal processes the banking transactions conducted by the card's holder according to the general account information during the "on-line" mode, and temporarily retains the banking transactions conducted by the card's holder during the "off-line" mode according to the electronic wallet account information. A host system for processes banking transaction conducted by the card's holder in communication with the card terminal and records "off-line" banking transactions retained in the card terminal during the "on-line" mode to update the general account of the card's holder.

Yet another aspect of the present invention contemplates a method of using an electronic passbook system, for withdrawing cash "off-line" through a card terminal using an electronic passbook card having a general account for an "on-line" transaction and an electronic wallet account for an "off-line" transaction. This method contemplates transfer of funds from the general account to the electronic wallet account of the card when the card terminal is "on-line" with a central office; withdrawal of transferred funds from the electronic wallet account when the card terminal is "off-line" with the central office; recordation of an "off-line" funds withdrawal transaction in the passbook card and the card terminal, respectively; and transmission of the "off-line" funds withdrawal transaction recorded in the card terminal to the central office when the card terminal is "on-line" with the central office.

Another aspect of the present invention contemplates a method of using an electronic passbook system, for depositing cash "off-line" through a card terminal using an electronic passbook card having a general account for an "on-line" transaction and an electronic wallet account for an "off-line" transaction. This method contemplates insertion of the electronic passbook card into a card terminal when the card terminal is in an "off-line" mode with a central office; making an "off-line" cash deposit into the wallet account; recordation of an "off-line" cash deposit transaction in the wallet account of the electronic passbook card and in the card terminal; and when the card terminal is in an "on-line" mode with the central office, transmission of the "off-line" cash deposit transaction recorded in the card terminal to the central office for a general account update.

This way the card's holder can regulate exactly how much cash the holder desires to be available to the credit of the wallet account. Cash deposit and withdrawal transactions can be made in an "off-line" mode flexibly and safely by way of the wallet account, and in an "on-line" mode reliably by way of the general account. Moreover, the card's holder can also protect against fraudulent "off-line" use of the passbook card because only the wallet account is accessible when the card terminal is "off-line" with the central office.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
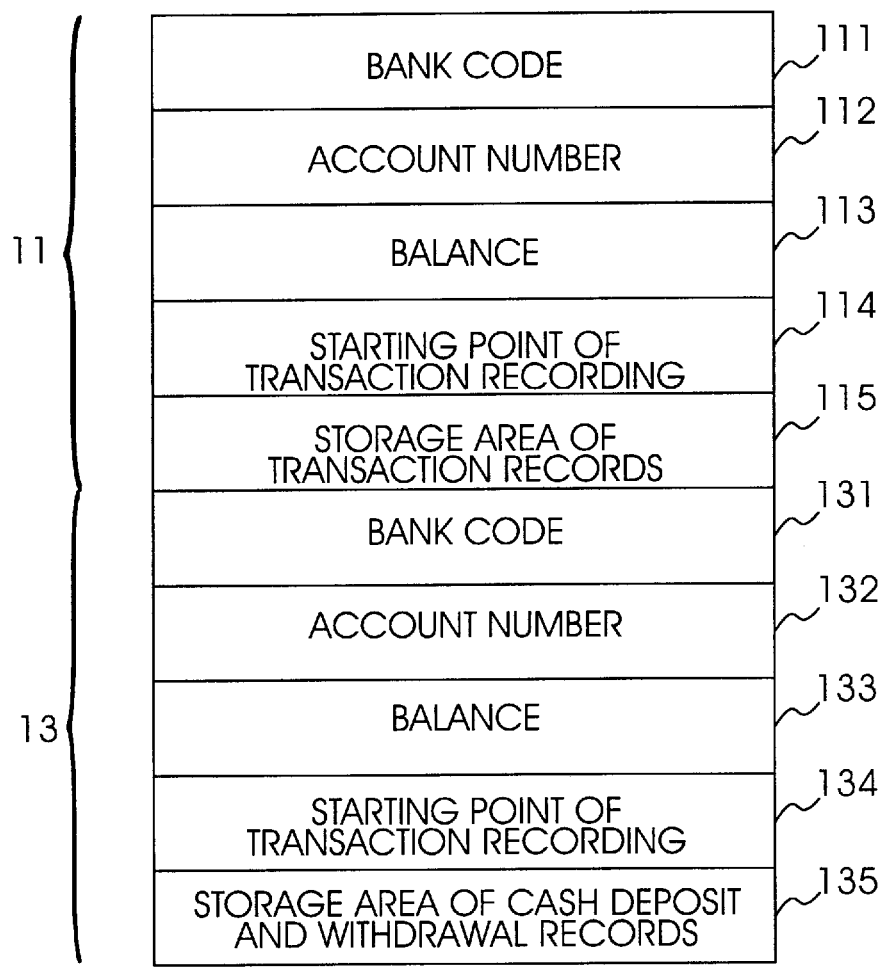
FIG. 1 illustrates financial information recorded in two separate accounts of an electronic passbook card as constructed according to the principles of the present invention.

Referring now to the drawings and particularly to FIG. 1 which illustrates financial information recorded in an electronic passbook card as constructed according to the principles of the present invention. The electronic passbook card as constructed according to the principles of the present invention contains two separate accounts, namely, a general account for storing all financial information concerning the card's holder, and an electronic wallet (or "purse") account for allowing the card's holder to gain access to quick cash from the passbook card without having to carry cash in his/her wallet regardless whether a passbook card system is "on-line" or "off-line." The electronic wallet account stored in the passbook card allows the user to regulate the amount of cash from the general account to be withdrawn at some later time when the passbook card system is "off-line."While the electronic passbook card allows the user to access to the electronic wallet account for a quick cash withdrawal when the passbook card system is "off-line," it may contain a blocking device for preventing access to the general account so that potential fraudulent "off-line" transactions on the general account can be minimized.

As shown in FIG. 1, the electronic passbook card contains a data memory having a general account information area 11 for recording financial information to process deposit and withdrawal transactions that a user or customer customarily engages with a financial institution, and an electronic wallet account information area 13 for recording financial information to process "on-line" or "off-line" cash deposit and cash withdrawal transactions commonly conducted by the user such as, for example, transmission of funds from the general account to the electronic wallet account. Alternatively, the general account information area 11 and the electronic wallet account information area 13 can also be accommodated by two discrete and separate memory devices contained in the electronic passbook card.

The general account information area 11 for recording information on a transaction performed "on-line" includes a bank code 111, an account number 112, a balance 113, a starting point of transaction recording 114, and a storage area of transaction records 115 of the account. Similarly, the electronic wallet account information area 13 includes a bank code 131, an account number 132, a balance 133, a starting point of transaction recording 134, and a storage area of cash deposit and withdrawal records 135 of the electronic wallet account. The electronic wallet account is used primarily to record funds transferred from the general account area 11 "on-line" and record cash deposit and withdrawal transactions "off-line." However, the electronic wallet account information area 13 can also record "on-line" deposit and withdrawal transaction.

To guard against the dangers imposed by carrying cash, a user can withdraw funds, using the electronic passbook card, in a suspended "on-line" operation through an ATM terminal on an as needed basis, after transferring funds from a general account to an electronic wallet account at either a teller's window or through the ATM card terminal during day time (during an "on-line" operation). That way the user can regulate exactly how much cash the user desires to be available in the wallet account so that cash is readily available to the wallet account and may be subsequently withdrawn at the command of the user during an "off-line" transaction.

Figure 2:
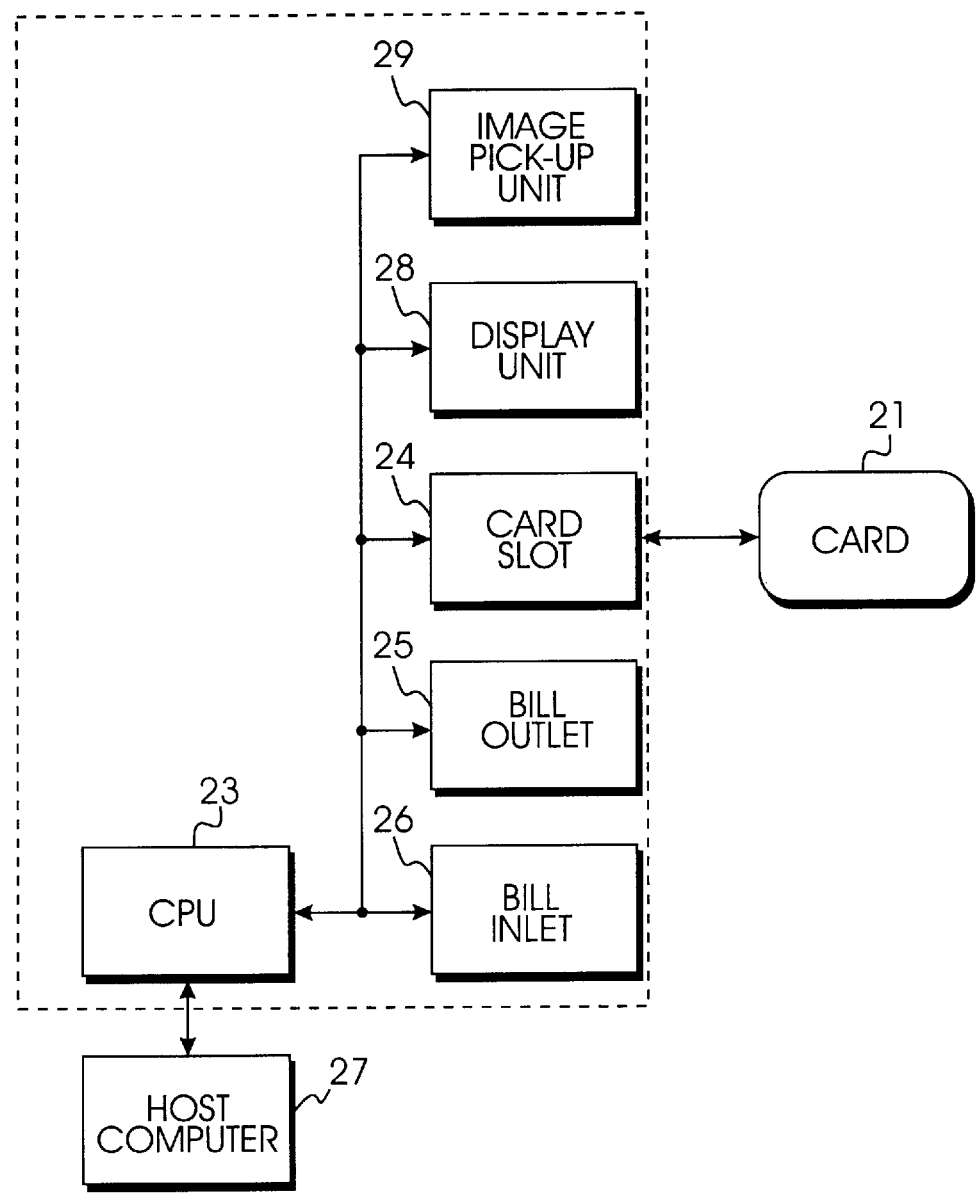
FIG. 2 is a schematic view of an electronic passbook system using the electronic passbook card constructed according to the principles of the present invention.

FIG. 2 is a schematic view of an electronic passbook system as constructed according to the principles of the present invention. A card 21 is the electronic passbook card as described in FIG. 1. A card terminal 22 has a central processing unit (CPU) 23, a card slot 24, a bill outlet 25 and a bill inlet 26. A host computer 27 is provided at the financial institution, for performing every transaction "on-line". The electronic passbook card 21 contains general account information for an "on-line" transaction and electronic wallet account information for an "off-line" transaction, and recording and reading of the transaction records. A card slot 24 functions to receive and read electronic passbook card 21 inserted therein. A bill outlet 25 is used for dispensing paper currency, and a bill inlet 26 is used for depositing cash. A CPU 23 functions to perform cash deposit and cash withdrawal transactions in an "on-line" manner according to the general account information area of electronic passbook card 21 and provides a visual display of all relevant instructions and transactions on a display unit 28 for the user's review and confirmation. Cash is withdrawn via the bill outlet 25 or is deposited via the bill outlet 26 according to the electronic account information of electronic passbook card 21 in an "off-line" manner. The CPU 23 then records all cash deposit and cash withdrawal transactions. A card terminal 22 records an "on-line" transaction in the general account of card 21 and an "off-line" transaction in the electronic wallet account of card 21.

The electronic passbook system as constructed according to the principles of the present invention can be used for identification of an unauthorized user and user detection by providing an additional image pick-up unit 29 such as a camera for photographing and storing information on the user of card terminal 22. A host computer 27 processes a transaction in communication with the card terminal 22 "on-line" or records an "off-line" transaction performed at any time through the card terminal 22.

Figure 3:
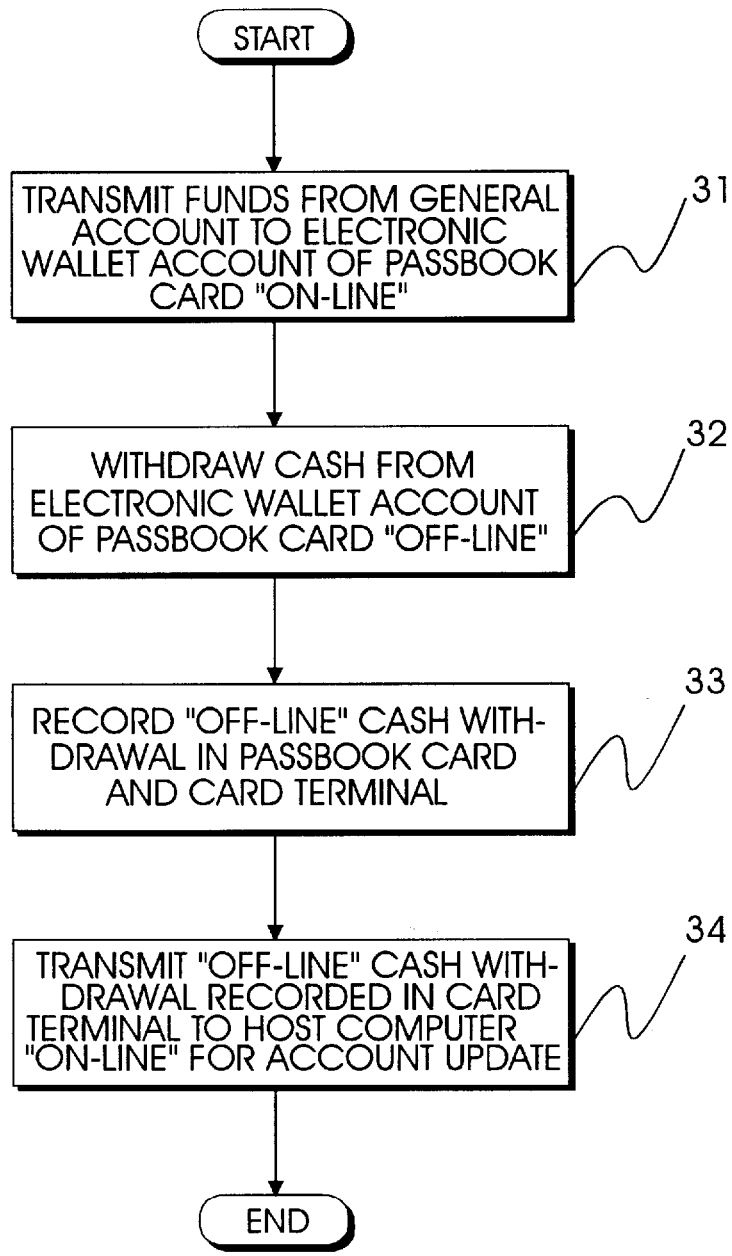
FIG. 3 is a flow chart illustrating a method of using an electronic passbook system for an "off-line" cash withdrawal transaction according to the present invention.

FIG. 3 illustrates a flow chart explaining a method of using an electronic passbook system for an "off-line" withdrawal transaction according to the present invention. Referring to FIG. 3, a method for withdrawing cash "off-line" through a card terminal using an electronic passbook card which has general account information for an "on-line" transaction and electronic wallet account information for an "off-line" transaction will be explained as follows.

First, a customer transfers designated funds from the general account of the card 21 to the electronic wallet account of the card 21 when the electronic passbook system is "on-line" with a financial institution in step 31. When the electronic passbook system "on-line" is suspended, that is, in an "off-line" mode, the customer may then withdraw the transferred funds from the electronic wallet account of the card 21 in step 32. In step 33, the "off-line" cash withdrawal transaction is then recorded in the card 21 and the card terminal 22, respectively, so that the "off-line" cash withdrawal transaction recorded in the card terminal 22 can be transmitted "on-line" to the host computer 27 when the electronic passbook system is back "on-line" again.

Figure 4:
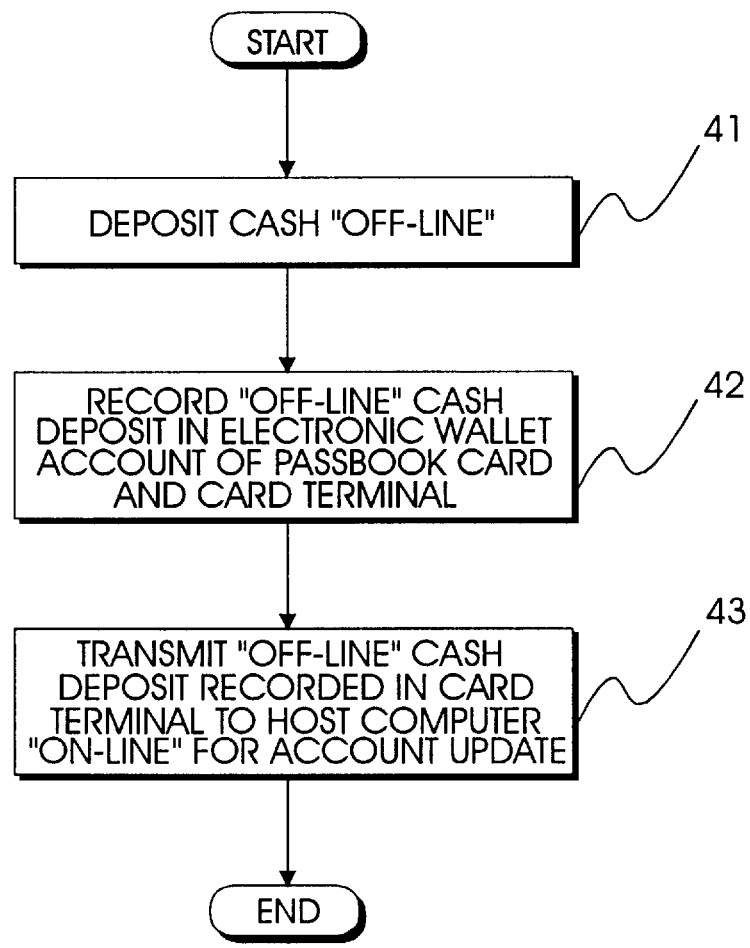
FIG. 4 is a flow chart illustrating a method of using an electronic passbook system for an "off-line" cash deposit transaction according to the present invention.

FIG. 4 illustrates a flow chart explaining a method of using an electronic passbook system for an "off-line" deposit transaction according to the present invention. Referring now to FIG. 4, a method for an "off-line" deposit through a card terminal using an electronic passbook card which includes general account information for an "on-line" transaction and electronic wallet account information for an "off-line" transaction will be explained as follows.

After inserting the passbook card 21 into the card terminal 22 when the electronic passbook system is "off-line," cash is deposited in step 41. "Off-line" cash deposit transaction is recorded in the electronic wallet account of the passbook card 21 and in the card terminal 22 in step 42. The "off-line" cash deposit transaction recorded in card terminal 22 is then automatically transmitted to host computer 27 for a general account update with the financial institution when the electronic passbook system subsequently returns to an "on-line". Similarly, information about funds recorded in the electronic wallet account of the passbook card 21 is read by the card terminal 22 and transferred to the general account for a general account update in the passbook card 21 corresponding to the general account kept at the host computer 27 by the financial institution whenever the user inserts the passbook card 21 into the card terminal 22.

As described above, the electronic passbook card, and the electronic passbook system using the card, and the method by which that card may be used, have the advantages in that the user can now safely make cash deposit and withdraw transactions, as desired, regardless of whether the system is "on-line" or "off-line".

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An electronic passbook card system, comprising:
    a passbook card comprising a data memory containing a general account information area for storing financial information about a general account of a card's holder, and an electronic wallet account information area for storing financial information about a wallet account of the card's holder; and a controller for, upon insertion of the passbook card into a card terminal by the card's holder, allowing the card's holder to conduct financial transactions through said card terminal with both the general account and wallet account while said card terminal is "on-line" with a central office, to record cash withdrawal transactions in the wallet account while said card terminal is "off-line" with the central office after designated funds have been transferred from the general account into the wallet account "on-line" by the card's holder, and to record cash deposit transactions in the wallet account while said card terminal is "off-line" with the central office irrespective of any funds transferred from the general account into the wallet account of the card's holder;
    said card terminal installed at a designated location, for processing said financial transactions conducted by the card's holder with the general account and wallet account, when said passbook card is inserted into said card terminal while said card terminal is "on-line" with the central office, and for temporarily retaining said cash withdrawal and deposit transactions conducted by the card's holder with the wallet account, when said passbook card is inserted into said card terminal while said card terminal is "off-line" with the central office; and
    a host system installed at said central office, for communicating with said card terminal to process said financial transactions conducted by the card's holder during said "on-line" and to process said cash withdrawal and deposit transactions retained in said card terminal during said "off-line".

2. The electronic passbook card system of claim 1, further comprised of said card terminal comprising means for providing visual display of transaction contents of the general account and the wallet account of the card's holder while said card terminal is "on-line" or "off-line".

3. The electronic passbook card system of claim 1, further comprised of said wallet account information area containing a financial institution code, an account number, a balance of the wallet account, and transaction data representing cash deposits and cash withdrawals.

4. The electronic passbook card system of claim 1, further comprised of said controller prohibiting access into the general account to conduct cash withdrawal transactions while said card terminal is "off-line."

5. An electronic passbook system, comprising:
    an electronic passbook card including a first memory containing general account information of a general account of a card's holder for allowing the card's holder to conduct banking transactions during an "on-line" mode, and a second memory containing electronic wallet account information of a wallet account of the card's holder for allowing the card's holder to conduct the banking transactions during an "off-line" mode;
    a card terminal installed at a designated location, for processing the banking transactions conducted by the card's holder according to said general account information, when said electronic passbook card is inserted into said card terminal during said "on-line" mode, and for temporarily retaining the banking transactions conducted by the card's holder according to said electronic wallet account information, when said electronic passbook card is inserted into said card terminal during said "off-line" mode; and
    a host system installed at a central financial institution, for communicating with said card terminal, during said "on-line" mode, to process said banking transactions conducted by the card's holder during said "on-line" mode, and said banking transactions retained in said card terminal during said "off-line" mode, and to update said general account of the card's holder.

6. The electronic passbook system of claim 5, further comprised of said card terminal comprising means for photographing the card's holder when the card's holder inserts said electronic passbook card into said card terminal to authenticate the identity of the card's holder.

7. The electronic passbook system of claim 5, further comprised of said general account information including the name of a financial institution, an account number, balance and transaction records of said general account, and said electronic wallet account information including the name of the financial institution, the account number, the balance and transaction records indicating cash deposits and withdrawals of said wallet account.

8. The electronic passbook system of claim 7, further comprised of said card terminal including means for providing a visual display of selective transaction contents of the general account and the wallet account of the card's holder.

9. The electronic passbook system of claim 8, further comprised of said card terminal automatically updating the general account with "off-line" banking transactions recorded in said electronic passbook card, when said electronic passbook card is inserted into said card terminal for banking transactions while said card terminal is in said "on-line" mode with the host system installed at the financial institution.

10. The electronic passbook system of claim 5, further comprised of said card terminal automatically updating the general account with "off-line" banking transactions recorded in said electronic passbook card, when said electronic passbook card is inserted into said card terminal for banking transactions while said card terminal is in said "on-line" mode with the host system installed at the financial institution.

11. A method of operating an electronic passbook system, comprising the steps:

inserting said electronic passbook card into an external card terminal when said external card terminal is in an "on-line" mode with a central office, said electronic passbook card containing a general account for an "on-line" transaction and a wallet account for an "off-line" transaction;

transferring funds from the general account of said electronic passbook card to the wallet account of said electronic passbook card;

re-inserting said electronic passbook card into said external card terminal, when said external card terminal is in an "off-line" mode with the central office;

withdrawing transferred funds from said wallet account during said "off-line" mode;

recording "off-line" funds withdrawal transaction in said wallet account of said electronic passbook card and said external card terminal, respectively; and transmitting said "off-line" funds withdrawal transaction recorded in said external card terminal to the central office for a general account update, when said external card terminal is in said "on-line" mode with the central office.

12. The method of claim 11, further comprising the step:

providing a visual display of transaction contents of the general account and the wallet account, upon request of a card's holder, when said external card terminal is in one of said "on-line" mode and said "off-line" mode with the central office.

13. The method of claim 11, further comprised of said wallet account containing the name of a financial institution, an account number, a balance, and transaction data representing cash deposits and cash withdrawals.

14. The method of claim 11, further comprising the steps:

inserting said electronic passbook card into said external card terminal, when said external card terminal is in an "off-line" mode with the central office;

making an "off-line" cash deposit into the wallet account;

recording an "off-line" cash deposit transaction in said wallet account of said electronic passbook card and in said external card terminal; and when said external card terminal is in an "on-line" mode with the central office, transmitting the "off-line" cash deposit transaction recorded in said external card terminal to the central office for a general account update.

15. The method of claim 14, further comprised of said external card terminal automatically updating the general account with the "offline" cash deposit transaction recorded in said electronic passbook card, when said electronic passbook card is re-inserted into said external card terminal while said external card terminal is in said "on-line" mode with the central office.

16. A method of operating an electronic passbook system, comprising the steps:

inserting said electronic passbook card into an external card terminal when said external card terminal is in an "off-line" mode with a central office, said electronic passbook card containing a general account for an "on-line" transaction and a wallet account for an "off-line" transaction;

making an "off-line" cash deposit into the wallet account;

recording an "off-line" cash deposit transaction in said wallet account of said electronic passbook card and in said external card terminal; and when said external card terminal is in an "on-line" mode with the central office, transmitting the "off-line" cash deposit transaction recorded in said external card terminal to the central office for a general account update.

17. The method claim 16, further comprised of said external card terminal automatically updating the general account with the "off-line" cash deposit transaction recorded in said electronic passbook card, when said electronic passbook card is re-inserted into said external card terminal while said external card terminal is in said "on-line" mode with the central office.

18. An electronic passbook card system, comprising:

a passbook card comprising a first memory for storing general account information corresponding to the name of a financial institution, an account number, balance and transaction records of a general account of a card's holder; a second memory for storing wallet account information corresponding to the name of a financial institution, the account number, the balance and transaction records of a wallet account of the card's holder; and a controller for, upon insertion of the passbook card into a card terminal by the card's holder, allowing the card's holder to conduct financial transactions through said card terminal with both the general account and wallet account when said card terminal is "on-line" with a host system installed at the financial institution, to record cash withdrawal transactions in the wallet account when said card terminal is "off-line" with the host system after designated funds have been transferred from the general account into the wallet account during said "on-line" by the card's holder, and to record cash deposit transactions in the wallet account when said card terminal is "off-line" with the host system irrespective of any funds transferred from the general account into the wallet account of the card's holder;

said card terminal installed at a designated location, for processing said financial transactions conducted by the card's holder with the general account and wallet account, when said passbook card is inserted into said card terminal while said card terminal is "on-line" with the host system, and for temporarily retaining said cash withdrawal and deposit transactions conducted by the card's holder with the wallet account, when said passbook card is inserted into said card terminal while said card terminal is "off-line" with the host system; and said host system installed at said financial institution, for communicating with said card terminal to process said financial transactions conducted by the card's holder during said "on-line" and to process said cash withdrawal and deposit transactions retained in said card terminal during said "off-line".

19. The electronic passbook card system of claim 18, further comprised of said card terminal comprising means for providing a visual display of selective transaction contents of the general account and the wallet account of the card's holder.

20. The electronic passbook card system of claim 18, further comprised of said controller prohibiting access into the general account to conduct cash withdrawal transactions while said card terminal is "off-line" with the host system installed at the financial institution.

* * * * *